Patented Dec. 1, 1925.

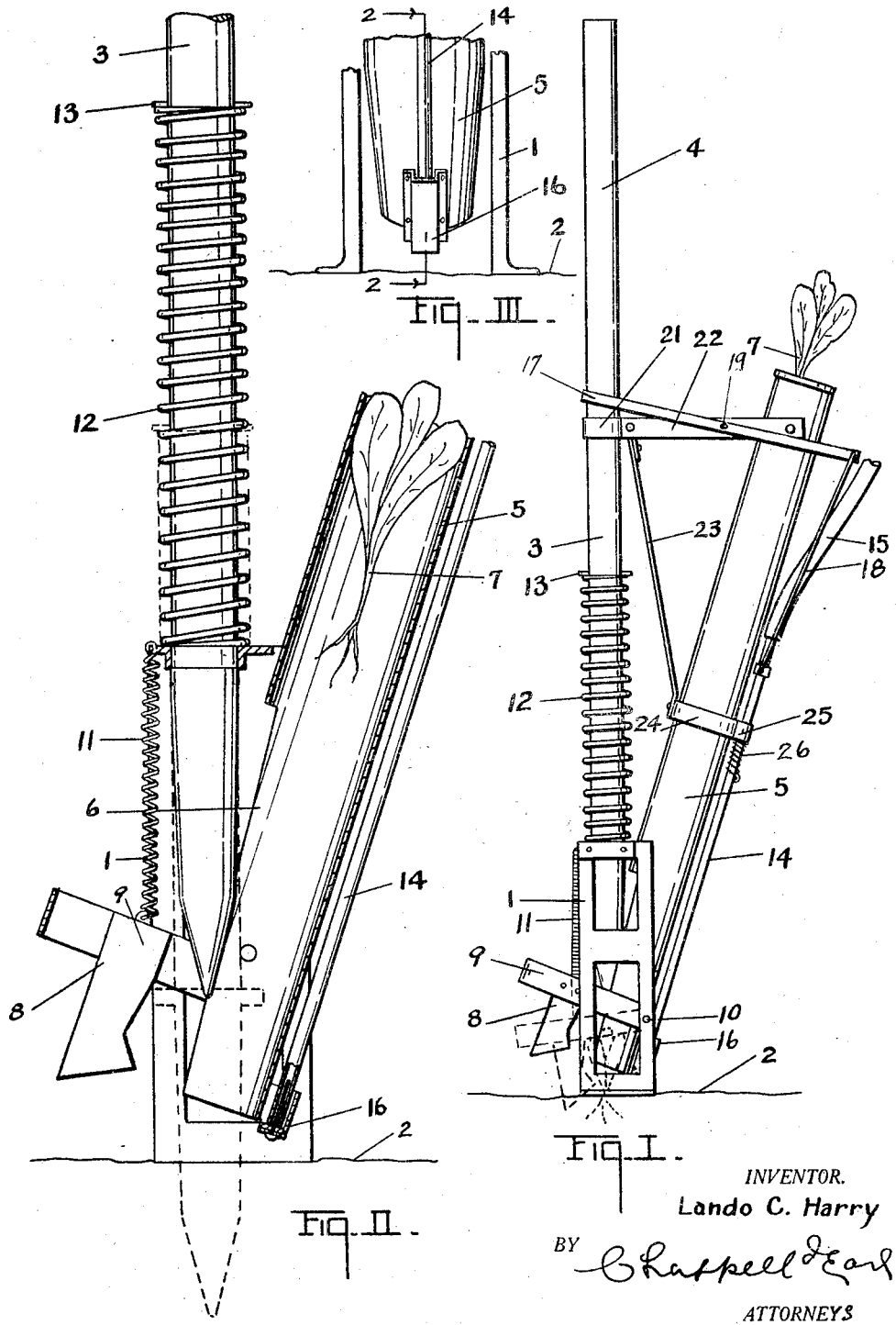

1,563,625

UNITED STATES PATENT OFFICE.

LANDO C. HARRY, OF CASCO TOWNSHIP, ALLEGAN COUNTY, MICHIGAN.

TRANSPLANTER.

Application filed June 17, 1922. Serial No. 568,941.

*To all whom it may concern:*

Be it known that I, LANDO C. HARRY, a citizen of the United States, residing at Casco Township, county of Allegan, State of Michigan, have invented certain new and useful Improvements in Transplanters, of which the following is a specification.

This invention relates to improvements in transplanters.

The main object of the invention is to provide an improved transplanter by means of which the plants may be set in the proper position and the earth compacted around the roots thereof, the hole made to receive the plant being effectively filled.

A further object is to provide an improved transplanter which enables the setting of a large number of plants and one which is comparatively easy to operate.

Further objects, and objects pertaining to details and economies of construction and operation will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing forming a part of this specification, in which:

Fig. I is a side elevation of my improved transplanter, the water supply connection being broken away.

Fig. II is an enlarged detail view of the plant chute, partially in section, on a line corresponding to line 2—2 of Fig. III, looking in the direction of the little arrows at the ends of the section line.

Fig. III is a detail elevation looking from the right of Figs. I and II.

In the drawing similar numerals of reference refer to similar parts in all of the views.

Referring to the drawing, the base frame 1 is adapted as a foot for the planter, that is, in use, it rests upon the ground indicated at 2. The dibble 3 is mounted to reciprocate in this base frame, being pointed to enter the ground. The dibble is extended to provide a handle 4.

The plant chute 5 is mounted in an inclined position to deliver to the hole formed by the dibble, the inner portion of the lower end of the chute being cut away at 6 so that the dibble reciprocates through the lower portion of the plant chute and the chute discharges the plant indicated at 7 into the hole in an upright position. The presser foot 8 is carried by an arm 9 pivotally mounted at 10 on the base frame so that it projects laterally to be engaged by the foot of the operator, and when forced downwardly, presses the earth into the hole upon the roots of the plant, as indicated in Fig. I, with a lateral swinging movement. A return spring 11 is provided for the presser foot. A return spring 12 is provided for the dibble, the lower end of the spring resting upon the base frame and its upper end engaging the pin 13.

With the parts thus arranged, the base is placed at the point at which it is desired to set the plant, the dibble is forced downwardly making a hole, the plant is dropped into the chute by which it is directed into the hole, and the presser foot is actuated to fill the hole and compress the earth around the roots of the plant.

In practice it is intended that the transplanter be operated by one person and the plants dropped into the chute by another person carrying the plants. While the transplanter may be operated by a single person, the speed may be greatly increased by two operators using a single planter.

Where it is desired to supply water to the plants, I provide a flexible water supply tube 15 which is connected to the upper end of the tube 14 slidably mounted on the bracket 25. A coiled spring 26 yieldingly holds this tube against a valve seat member 16 which also serves to slidably support the lower end of the tube. This valve seat member opens forwardly so that the water discharged from the tube is directed into the hole formed by the dibble. The valve member 16 is connected to the lever 17 by the link 18. The lever 17 is pivoted at 19 and is arranged in convenient operating relation to the handle portion of the dibble. When it is desired to discharge water, a down push on the lever 17 lifts the member 14 from its seat, thereby allowing the water to discharge into the hole formed by the dibble.

The dibble reciprocates through an eye 21 on the brace piece 22 extending from the upper end of the chute 5. A brace 23 extends from the brace 22 to a band 24 disposed midway of the chute, the band 24 also supporting the water delivery tube 14.

With this arrangement of parts, I provide a transplanter by the aid of which plants may be rapidly and effectively transplanted; that is, they are well seated in the earth, which is a desirable feature of a transplanter. Another advantage is that the transplanter is comparatively easy to operate.

Having thus described my invention, what I claim as new and desire to secure by Letters Patent is:

In a transplanter, the combination of a base frame adapted to rest upon the ground, a dibble mounted to reciprocate on said base and constituting a handle, a return spring for said dibble, a plant chute mounted on said base, a presser foot pivotally mounted on said base and projecting to be actuated by the foot of the operator, and a return spring for said presser foot.

In witness whereof, I have hereunto set my hand and seal.

LANDO C. HARRY. [L. S.]